United States Patent
Inoue et al.

(10) Patent No.: US 12,253,443 B2
(45) Date of Patent: Mar. 18, 2025

(54) ELEMENTAL ANALYSIS DEVICE FOR ANALYZING TEST SAMPLE HAVING CLEANING GAS SUPPLY MECHANISM

(71) Applicant: HORIBA, LTD., Kyoto (JP)

(72) Inventors: Takahito Inoue, Kyoto (JP); Hiroshi Uchihara, Kyoto (JP)

(73) Assignee: HORIBA, LTD., Kyoto (JP)

( * ) Notice: Subject to any disclaimer, the term of this patent is extended or adjusted under 35 U.S.C. 154(b) by 344 days.

(21) Appl. No.: 17/905,856

(22) PCT Filed: Feb. 18, 2021

(86) PCT No.: PCT/JP2021/006093
§ 371 (c)(1),
(2) Date: Sep. 8, 2022

(87) PCT Pub. No.: WO2021/182059
PCT Pub. Date: Sep. 16, 2021

(65) Prior Publication Data
US 2023/0098544 A1    Mar. 30, 2023

(30) Foreign Application Priority Data
Mar. 11, 2020   (JP) ................................. 2020-042062

(51) Int. Cl.
*G01N 1/22* (2006.01)
*G01N 1/14* (2006.01)
(Continued)

(52) U.S. Cl.
CPC ............ *G01N 1/2205* (2013.01); *G01N 1/14* (2013.01); *G01N 1/2035* (2013.01);
(Continued)

(58) Field of Classification Search
None
See application file for complete search history.

(56) References Cited

U.S. PATENT DOCUMENTS 5,490,429 A * 2/1996 Jarolics .............. B01D 46/2407
73/863.83
6,627,155 B1 * 9/2003 Uemura ................. G01N 31/12
436/160
(Continued)

FOREIGN PATENT DOCUMENTS

JP    02-095863 U    7/1990
JP    2000-002699 A   1/2000
(Continued)

OTHER PUBLICATIONS

European Patent Office, "Extended European Search Report", dated Feb. 7, 2024, which was issued in connection with the related European patent application No. 21766986.0, 8 pages.
(Continued)

*Primary Examiner* — Peter J Macchiarolo
*Assistant Examiner* — Jermaine L Jenkins
(74) *Attorney, Agent, or Firm* — LUCAS & MERCANTI, LLP

(57) ABSTRACT

An elemental analysis device includes a heating furnace in which a test sample that is placed in a crucible is heated so that a sample gas is generated from the test sample, an inflow path through which a carrier gas is introduced into the heating furnace, an outflow path through which a mixture gas made up of the carrier gas and the sample gas is led out from the heating furnace, a dust filter that is provided on the outflow path, an analysis mechanism that is provided on the outflow path on a downstream side from the dust filter, and that detects one or a plurality of predetermined components contained in the mixture gas, and a cleaning gas supply mechanism that supplies cleaning gas to the dust filter in an opposite direction from a direction in which the mixture gas is flowing.

17 Claims, 12 Drawing Sheets

(51) Int. Cl.
  *G01N 1/20* (2006.01)
  *G01N 1/34* (2006.01)
(52) U.S. Cl.
  CPC ......... *G01N 1/2226* (2013.01); *G01N 1/2247* (2013.01); *G01N 1/34* (2013.01); *G01N 2001/1436* (2013.01); *G01N 2001/205* (2013.01); *G01N 2001/2235* (2013.01); *G01N 2001/2238* (2013.01); *G01N 2001/227* (2013.01)

(56) References Cited

U.S. PATENT DOCUMENTS

| | | | | |
|---|---|---|---|---|
| 9,778,148 | B2* | 10/2017 | Taniguchi | G01N 31/12 |
| 10,627,355 | B2* | 4/2020 | Inoue | F27B 17/02 |
| 2016/0187232 | A1 | 6/2016 | Taniguchi et al. | |
| 2018/0348153 | A1 | 12/2018 | Inoue | |

FOREIGN PATENT DOCUMENTS

| | | |
|---|---|---|
| JP | 2000-065696 A | 3/2000 |
| JP | 2000-258307 A | 9/2000 |
| JP | 2000-266741 A | 9/2000 |
| JP | 2000-338019 A | 12/2000 |
| JP | 2004-077259 A | 3/2004 |
| JP | 2004-286698 A | 10/2004 |
| JP | 2007-187579 A | 7/2007 |
| JP | 2010-008111 A | 1/2010 |
| JP | 2010-032264 A | 2/2010 |

OTHER PUBLICATIONS

International Search Report for the corresponding patent application No. PCT/JP2021/006093 dated May 11, 2021, with English translation.

* cited by examiner

ELEMENTAL ANALYSIS DEVICE FOR ANALYZING TEST SAMPLE HAVING CLEANING GAS SUPPLY MECHANISM

CROSS REFERENCE TO RELATED APPLICATION

This Application is a 371 of PCT/JP2021/006093 filed on Feb. 18, 2021, which, in turn, claims priority of Japanese Patent Application No. 2020-042062 filed on Mar. 11, 2020, and the above applications are incorporated herein by reference.

TECHNICAL FIELD

The present invention relates to an elemental analysis device that analyzes elements contained in a test sample based on a sample gas created by heating the test sample.

TECHNICAL BACKGROUND

An elemental analysis device is used in order to quantify elements such as, for example, nitrogen (N), hydrogen (H), and oxygen (O) and the like contained in a test sample. In this type of elemental analysis device, a graphite crucible containing a test sample is sandwiched inside a heating furnace between a pair of electrodes. Direct current is then supplied to the crucible so that both the crucible and the test sample are heated. A mixture gas made up of a sample gas generated by this heating and a carrier gas is then passed through a dust filter so that dust such as soot and the like is filtered out. Concentrations of various types of components contained in the filtered mixture gas are then measured by an analysis mechanism in the form of an NDIR (Non-Dispersive InfraRed) sensor or TCD (Thermal Conductivity Detector) or the like.

In a case in which a dust filter formed, for example, from quartz wool or the like has collected a predetermined quantity or more of dust such as soot or the like, then in order to maintain the accuracy of the measurements made by the analysis mechanism it is necessary to replace the dust filter. The frequency of replacing this type of dust filter is often higher than what a user might hope for, so that there is a possibility that the time and labor required for such maintenance will impose a considerable burden on a user.

DOCUMENTS OF THE PRIOR ART

Patent Documents

[Patent Document 1] Japanese Unexamined Patent Application (JP-A) No. 2010-32264

DISCLOSURE OF THE INVENTION

Problems to be Solved by the Invention

The present invention was conceived in view of the above-described problems, and it is an object thereof to provide an elemental analysis device that enables the dust filter replacement frequency to be reduced, and enables the time and labor required for maintenance performed by a user to also be reduced.

Means for Solving the Problem

In other words, an elemental analysis device according to the present invention is characterized in being provided with a heating furnace in which a test sample that is placed in a crucible is heated so that a sample gas is generated from the test sample, an inflow path through which a carrier gas is introduced into the heating furnace, an outflow path through which a mixture gas made up of the carrier gas and the sample gas is led out from the heating furnace, a dust filter that is provided on the outflow path, an analysis mechanism that is provided on the outflow path on a downstream side from the dust filter, and that detects one or a plurality of predetermined components contained in the mixture gas, and a cleaning gas supply mechanism that supplies cleaning gas to the dust filter in an opposite direction from a direction in which the mixture gas is flowing.

If this type of structure is employed, then dust such as soot and the like that has collected in the dust filter is flushed out onto the heating furnace side by cleaning gas supplied by the cleaning gas supply mechanism, so that the dust filter can be restored. As a result, it is possible to reduce the frequency of maintenance such as replacement and cleaning of the dust filter to less than what has conventionally been necessary.

Moreover, because the cleaning gas is made to flow in reverse along the outflow path from a position between the dust filter and the analysis mechanism on the outflow path, dust such as soot and the like that has become detached from the dust filter does not flow into the analysis mechanism. Accordingly, the accuracy of analyses performed by the analysis mechanism can be maintained even when the dust filter is restored.

In order to ensure that the cleaning gas flows in reverse along the outflow path towards the dust filter, and to ensure that cleaning gas does not flow into the analysis mechanism and that dust such as soot and the like that has become detached from the dust filter does not reach the analysis mechanism, it is preferable that there be further provided an exhaust flow path that branches off from between the dust filter and the analysis mechanism on the outflow path, and through which the mixture gas that has passed through the dust filter is exhausted, and that the cleaning gas supply mechanism be provided with a flow path switching portion that is equipped with at least a switching valve that is disposed on a branch point between the outflow path and the branch flow path, and that switches flow paths in such a way that cleaning gas flows in an opposite direction from a direction in which the mixture gas is flowing along the outflow path, and a cleaning gas supply portion that supplies cleaning gas to the exhaust flow path or to the switching valve.

A specific aspect that is intended to cause the cleaning gas to flow in the opposite direction from the mixture gas to the dust filter and to enable the dust filter to be restored is a structure in which the cleaning gas supply portion is provided with a cleaning gas supply source that blows out cleaning gas at a predetermined pressure, and a cleaning gas supply flow path that connects the cleaning gas supply source to the exhaust flow path, and in which the flow path switching portion is provided with a first 3-way valve which serves as the switching valve, and a second 3-way valve that is disposed at a point of confluence of the exhaust flow path and the cleaning gas supply flow path. If this type of structure is employed, then because the second 3-way valve which is needed to form part of the cleaning gas supply portion is disposed on the outflow path, the analysis accuracy can be maintained without superfluous valves being installed unnecessarily on the outflow path, as is the case in a conventional elemental analysis device. In other words, if valves other than the first 3-way valve are additionally installed on the outflow path, then there is an increase in the number of locations where the flow of mixture gas may become sluggish when analysis is being performed, and there is a possibility that this will cause a deterioration in the flow of gas to the analysis mechanism when analysis is being performed and may lead to a reduction in the sensitivity and the like. Moreover, when cleaning gas is being blown onto the dust filter so as to create a backwash, there is a possibility of components of the cleaning gas remaining in the valves that are provided on the outflow path and of these cleaning gas components being detected by the analysis mechanism together with the mixture gas when the subsequent analysis is being performed, so that the accuracy of the analysis may deteriorate. If the above-described second 3-way valve arrangement is employed, then problems such as these can be prevented from occurring in the first place.

Another aspect that enables any reduction in the analysis accuracy due to the number of valves on the outflow path being increased to be avoided, while still enabling the dust filter to be back-washed by cleaning gas is a structure in which the cleaning gas supply portion is provided with a cleaning gas supply source that blows out cleaning gas at a predetermined pressure, and a cleaning gas supply flow path that is connected to the cleaning gas supply source, and in which, as the switching valve, the flow path switching portion is provided with a 4-way valve that switches flow paths in such a way that any one of the analysis mechanism side of the outflow path, the exhaust flow path, or the cleaning gas supply flow path is connected to the heating furnace side of the outflow path.

In order to enable dust such as soot and the like that has been collected by the cleaning gas supplied by the cleaning gas supply mechanism to become detached and to thereby enable the dust filter to be easily restored, and to consequently further reduce the maintenance frequency, it is preferable that the dust filter be provided with a membrane filter, and a filter holder that holds the membrane filter by sandwiching the membrane filter in a thickness direction thereof. If this type of structure is employed, then in a case in which the membrane filter can no longer be restored in a cleaning gas, the membrane filter can simply be removed from the filter holder and replaced with a new membrane filter. Accordingly, the time and labor required for the replacement operation can be reduced compared to the conventional technology.

In order to lighten the weight of the dust filter and enable the time and labor required for the replacement operation to be reduced, it is preferable that the filter holder be formed from resin or glass. In addition, if the filter holder is formed from transparent resin or glass, then because it is possible, for example, to confirm visually how much dust such as soot and the like has been collected on the membrane filter, it is easy to determine the period when cleaning gas should be supplied. Because of this, the frequency of supplying cleaning gas can be reduced to a minimum, and the time and labor required for the maintenance can be reduced.

Instead of having to replace the dust filter, in order to enable it to be used continuously by means of cleaning gas backwashing and to thereby enable the frequency of performing maintenance to be reduced, it is preferable that the dust filter be provided with a metal filter and a filter holder to which the metal filter is welded.

If a structure is employed in which the heating furnace includes a first electrode, a second electrode that is formed so as to be able to move between a closed-furnace position where it sandwiches the crucible between itself and the first electrode, and an open-furnace position that is separated by a predetermined distance from the closed-furnace position, a drive mechanism that causes the second electrode to move between the closed-furnace position and the open-furnace position, a dust-suction flow path that opens in the interior of the heating furnace and is equipped with a dust-suction port that draws in dust, and an ejector that is equipped with an intake port that is connected to the heating furnace side of the dust-suction flow path, a discharge port that is connected to the discharge side of the dust-suction flow path, and a drive port to which a working fluid is supplied, and in which the drive mechanism is formed in such a way that, in a case in which the drive mechanism moves the second electrode from the closed-furnace position to the open-furnace position, the working fluid flows into the drive port of the ejector, then the ejector can be made to perform a suction action at the same time as the second electrode is moved from the closed-furnace position to the open-furnace position.

Accordingly, dust that is generated in conjunction with the opening of the heating furnace can be collected via the dust suction flow path from the dust suction port inside the heating furnace as a consequence of the suction action of the ejector.

Moreover, because one characteristic of the ejector is that it is able to suction at a flow rate that is several times greater than the flow rate of the working fluid that is being supplied, an extremely high level of suction force can be applied to the interior of the heating furnace so that the dust can be almost completely removed.

In order to cause the drive mechanism to operate by means of the working fluid that is used to make the ejector perform a suction action, and to thereby simplify the structure of the overall device, it is preferable that the drive mechanism be a hydraulic cylinder that is equipped with a first port through which the working fluid either flows in or flows out, and is formed in such a way that, in a case in which the working fluid flows in through the first port, a piston rod is drawn in so that the second electrode is moved to the open-furnace position side, and is also formed in such a way that, in a case in which the working fluid flows into the hydraulic cylinder through the first port, the working fluid also flows into the ejector through the drive port.

In a case in which the hydraulic cylinder is operated so that the second electrode is moved to the open-furnace position side, in order to ensure that the working fluid is supplied at the same time automatically to the ejector without the switching valve needing to be controlled, and to also ensure that the operation to open the heating furnace is performed in conjunction with the suction action performed by the ejector, it is preferable that there be further provided a first supply line that connects a supply source for the working fluid to the first port, and a drive line that branches off from the first supply line and is connected to the drive port.

In a case in which the second electrode has been moved to the closed-furnace position, in order to ensure that the crucible can be sandwiched with sufficient strength between the first electrode and the second electrode, it is preferable that the hydraulic cylinder be equipped with a second port through which the working fluid either flows in or flows out, and be formed in such a way that, in a case in which the working fluid flows in through the second port, a piston rod is pushed out so that the second electrode is moved to the closed-furnace position side.

In order to ensure that the working fluid is easily prepared in an environment such as that in which the elemental analysis device is used, and is also easily discarded in this environment, and so as to also ensure that the suction force exerted by the ejector can be made sufficiently large, it is preferable that the hydraulic cylinder be an air cylinder, and that the working fluid be compressed air.

An example of this type of structure is an elemental analysis device further provided with a supporting body inside which is formed the dust suction flow path, and that supports the second electrode, and in which the piston rod of the hydraulic cylinder is connected to the supporting body.

In order to ensure that dust can be suctioned evenly from inside the heating furnace, it is preferable that the dust suction flow path be provided with a plurality of dust suction ports that open onto a surface of the supporting body.

An example of a structure that is specifically designed to clean dust adhering to the first electrode or second electrode after the heating furnace has been opened is a structure that is further provided with a cleaning mechanism that is formed in such a way that, in a case in which the second electrode is in the open-furnace position, the cleaning mechanism moves between the first electrode and the second electrode and removes dust from the first electrode or the second electrode, wherein the cleaning mechanism is also formed in such a way that the dust removed from the first electrode of the second electrode by the cleaning mechanism is collected from inside the heating furnace via the dust suction flow path.

In order to ensure that, in a case in which cleaning gas is supplied in order to restore the dust filter, dust that is flowing into the heating furnace through this dust filter is automatically collected, and the level of cleanliness of the heating furnace is maintained, it is preferable that a structure be employed in which the heating furnace includes a first electrode, a second electrode that is formed so as to be able to move between a closed-furnace position where it sandwiches the crucible between itself and the first electrode, and an open-furnace position that is separated by a predetermined distance from the closed-furnace position, a drive mechanism that causes the second electrode to move between the closed-furnace position and the open-furnace position, a dust-suction flow path that opens in the heating interior of the furnace and is equipped with a dust-suction port that draws in dust, and an ejector that is equipped with an intake port that is connected to the heating furnace side of the dust-suction flow path, a discharge port that is connected to the discharge side of the dust-suction flow path, and a drive port to which a working fluid is supplied, and in which the cleaning gas supply mechanism is formed in such a way that, in a case in which the cleaning gas is flowing to the dust filter in an opposite direction from a direction in which the mixture gas is flowing, the working fluid flows into the drive port of the ejector.

Effects of the Invention

As is described above, if an elemental analysis device according to the present invention is employed, then it is possible to cause dust such as soot and the like that has been collected as a result of cleaning gas being supplied by the cleaning gas supply mechanism during an analysis to the dust filter in the opposite direction from the direction in which the mixture gas is being supplied to flow into the heating furnace. Because of this, it is possible to restore the dust filter and reduce the dust filter replacement frequency, and to ensure that dust such as soot and the like that has become detached from the dust filter while the dust filter is being restored does not reach the analysis mechanism so that the analysis accuracy can be maintained.

DESCRIPTION OF THE REFERENCE NUMERALS

100 . . . Elemental Analysis Device
1 . . . Supply Source
2 . . . Purifier
3 . . . Heating Furnace
31 . . . Upper Portion Electrode (First Electrode)
32 . . . Lower Portion Electrode (Second Electrode)
33 . . . Supporting Body
34 . . . Air Cylinder
35 . . . Piston Rod
36 . . . Cylinder
37 . . . Ejector
DL . . . Dust Suction Flow Path
DP . . . Dust Suction Port
4 . . . Dust Filter
41 . . . Membrane Filter, Metal Filter, Metal Mesh Filter
42 . . . Filter Holder
5 . . . CO Detection Portion
6 . . . Oxidizer
7 . . . $CO_2$ Detection Portion
8 . . . $H_2O$ Detection Portion
9 . . . Removal Mechanism
10 . . . Mass Flow Controller 11 . . . N₂ Detection Portion (Thermal Conductivity Analysis Portion)
R . . . Cleaning Gas Supply Mechanism
RS . . . Cleaning Gas Supply Portion
RC . . . Flow Path Switching Portion
R1 . . . Cleaning Gas Supply Source
R2 . . . Cleaning Gas Supply Flow Path
R3 . . . First 3-Way Valve
R4 . . . Second 3-Way Valve

BEST EMBODIMENTS FOR IMPLEMENTING THE INVENTION

Figure 1:
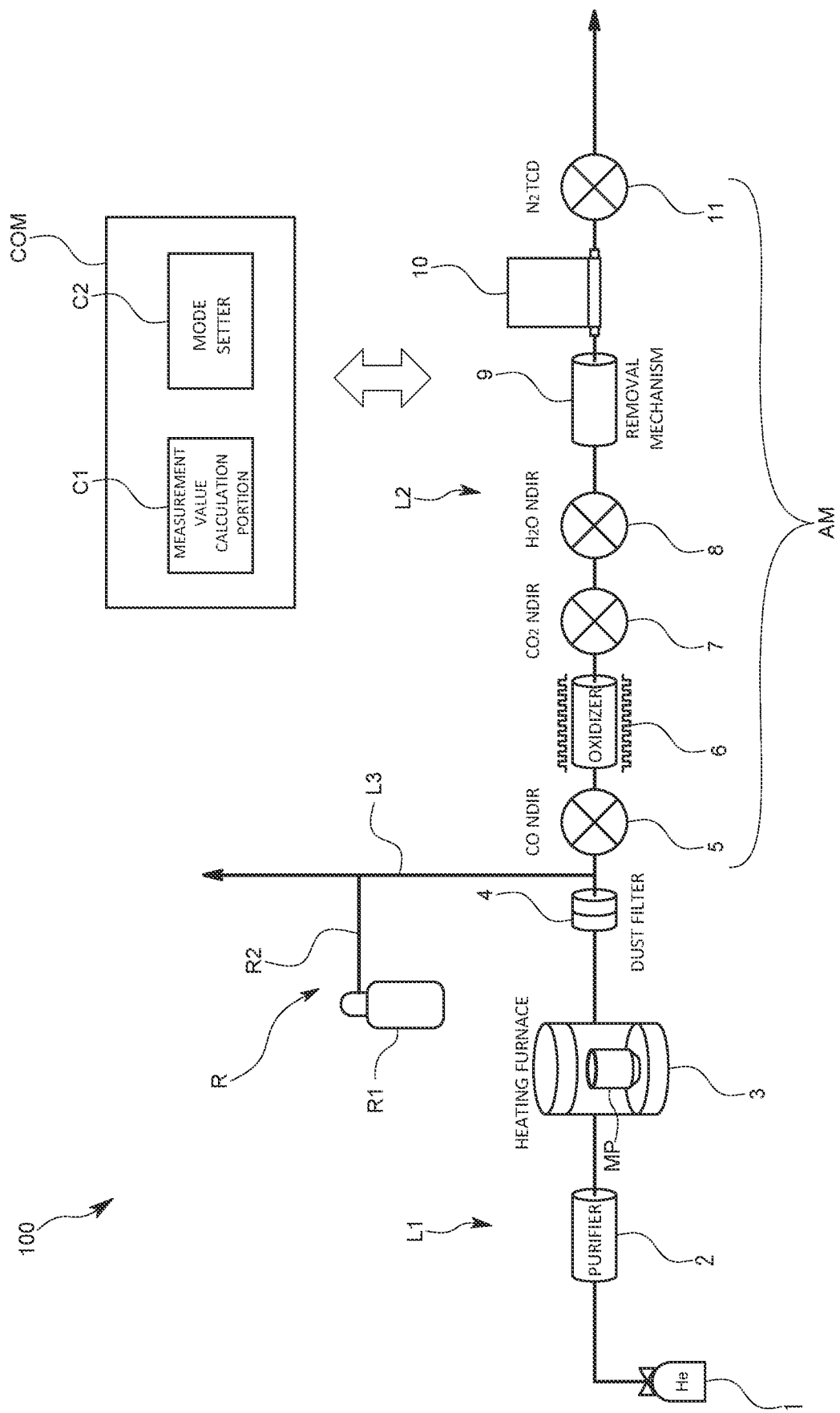
FIG. 1 is a schematic view showing an overall structure of an elemental analysis device according to an embodiment of the present invention.

An elemental analysis device 100 according to an embodiment of the present invention will now be described with reference to the respective drawings. An outline of the elemental analysis device 100 of the present embodiment is shown in FIG. 1. The elemental analysis device 100 applies heat to, for example, a metal test sample or a ceramic test sample or the like (hereinafter, referred to simply as a test sample) that is contained in a graphite crucible MP so as to melt this test sample, and then analyzes sample gases that are generated at this time so as to measure quantities of elements that are contained in the test sample. In the first embodiment, the elements being measured are O (oxygen), H (hydrogen), and N (nitrogen) that are contained in the test sample.

More specifically, as is shown in FIG. 1, the elemental analysis device 100 is provided with a heating furnace 3 in which the test sample contained in the crucible MP is heated, an inflow path L1 through which a carrier gas is introduced into the heating furnace 3, and a outflow path L2 through which a mixture gas made up of a carrier gas and a sample gas is led out from the heating furnace 3. More specifically, the elemental analysis device 100 is formed by the heating furnace 3, various devices that are provided on the inflow path L1 and the outflow path L2, and a control and calculation mechanism COM that controls the various instruments and governs calculation processing for the concentrations and the like that have been measured. The control and calculation mechanism COM is, for example, a computer having a CPU, memory, A/D converters, D/A converters, and various types of input and output devices. As a result of programs stored in the memory being executed and the various instruments operating in mutual collaboration with each other, the control and calculation mechanism COM is able to perform functions of a measurement value calculation portion C1 and a mode setter C2 (described below). In addition, the control and calculation mechanism COM also performs functions of a display portion (not shown in the drawings) that displays concentrations of various types of elements contained in a test sample based on outputs from, for example, a CO detection portion, 5, a CO₂ detection portion 7, an H₂O detection portion 8, and an N₂ detection portion 11 (these are described below in detail).

Each portion will now be described in detail.

A gas canister, which is serving as a carrier gas supply source 1, is connected to a base end of the inflow path 1. In the first embodiment, He (helium) is supplied from the supply source 1 to the inside of the inflow path L1. In addition, a purifier 2 that removes minute quantities of hydrocarbons contained in the carrier gas so as to raise the purity thereof is provided on the inflow path L1.

The purifier 2 is formed from a material whose characteristics include an ability to cause hydrocarbons contained in the carrier gas to physically adhere thereto, while essentially preventing the carrier gas itself from adhering thereto.

Note that the material forming the purifier 2 does not react chemically either with the carrier gas or with the hydrocarbons. In other words, the purifier 2 is also used, for example, in gas chromatography, and, for example, a zeolite-based molecular sieve or the like may be used as the material forming the purifier 2. Additionally, it is also possible for silica gel, activated carbon, or Ascarite or the like to be used as the material forming the purifier 2.

The heating furnace 3 is formed so as to sandwich the graphite crucible MP containing a test sample between a pair of electrodes in the form of a first electrode and a second electrode, and to then supply direct current to the crucible MP so as to heat both the crucible MP and the test sample contained therein. More specifically, as is shown in FIG. 2 and the like, the heating furnace 3 is provided with an upper portion electrode 31, which is a circular-cylinder shaped first electrode in which an internal space is formed, and a lower portion electrode 32, which is a circular-column shaped second electrode that is inserted into the internal space and that sandwiches the crucible MP between itself and the upper portion electrode 31.

A through-hole extending in an up-down direction that is used to supply carrier gas supplied from the inflow path L1 into the internal space is formed in the upper portion electrode 31. In addition, a mixture gas that is formed by a sample gas created from the test sample and the carrier gas flows via a through-hole formed in a side surface of the upper portion electrode 31 into the outflow path L2.

Figure 2:
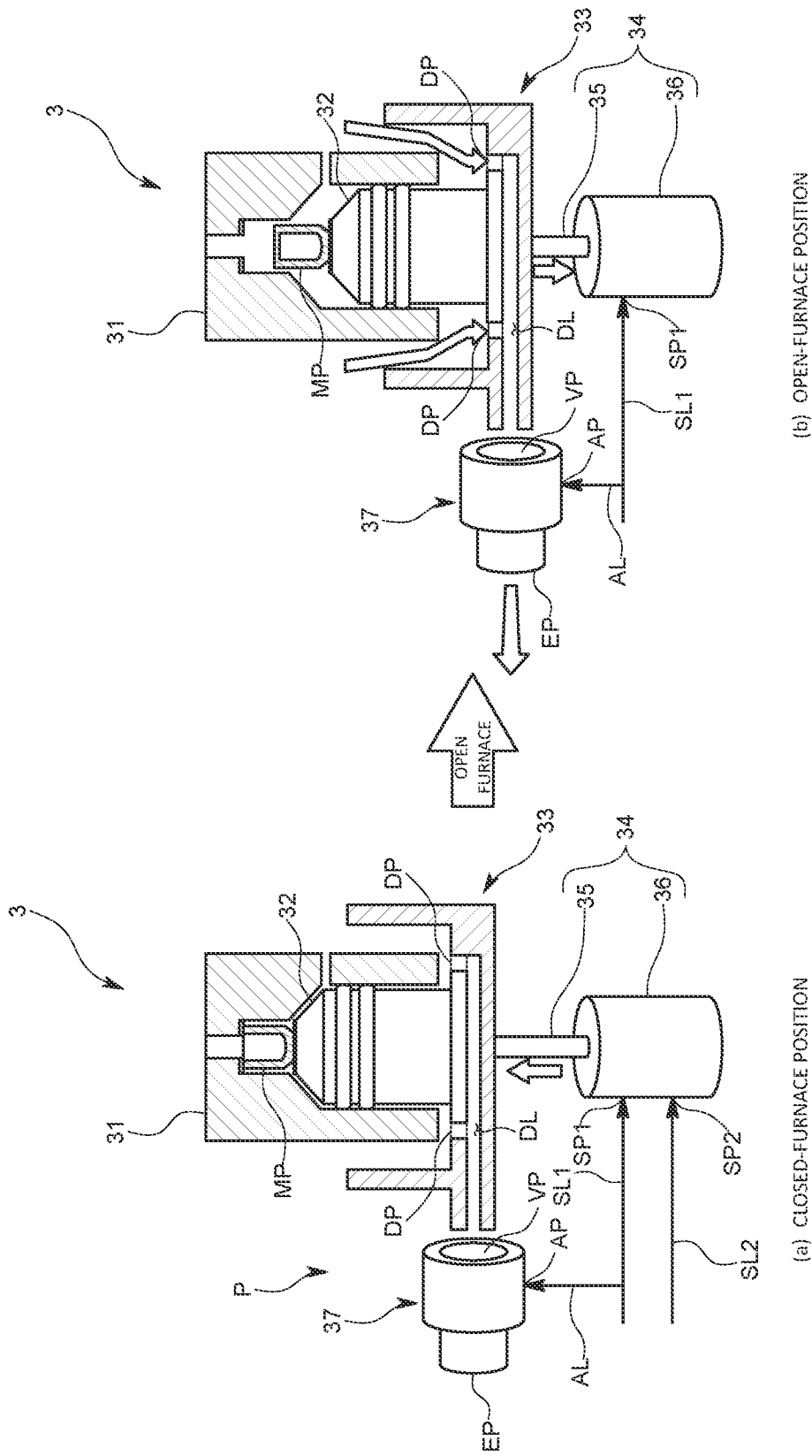
FIG. 2 is a schematic view showing a heating furnace and peripheral structure around this heating furnace according to the same embodiment.

Furthermore, as is shown in FIG. 2, the lower portion electrode 32 is formed so as to be advanced and withdrawn in an up-down direction by an air cylinder 34, which is a linear-motion hydraulic cylinder. In other words, more specifically, in a case in which a test sample is heated inside the crucible MP, the lower portion electrode 32 is moved upwards by the air cylinder 34, and is inserted into the internal space in the upper portion electrode 31. In this state, the crucible MP is sandwiched between the upper portion electrode 31 and the lower portion electrode 32. Moreover, the lower portion electrode 32 seals off a lower-side aperture in the upper portion electrode 31 with an airtight seal by means of a sealing portion that is provided on a side surface thereof so as to protrude outwards in a circumferential direction. As a result, the mixture gas that is formed by mixing together the sample gas generated as a result of the test sample being heated and the carrier gas flows from the side-surface side of the upper portion electrode 31 into the outflow path L2.

In other words, the lower portion electrode 32 is formed so as to be able to move between a closed-furnace position where, as is shown in FIG. 2 (*a*), it sandwiches the crucible between itself and the upper portion electrode 31, and an open-furnace position which, as is shown in FIG. 2 (*b*), is separated by a predetermined distance from the closed-furnace position. In the present embodiment, the closed-furnace position is located below the open-furnace position. In the closed-furnace position, a door (not shown in the drawings) in the heating furnace 3 is closed so that the sample gas generated inside the heating furnace 3 does not leak out to the outside. In contrast, in the open-furnace position, the door (not shown in the drawings) is opened so that replacement of the crucible MP, or internal cleaning and maintenance of the heating furnace 3 can be performed. In other words, in a case in which the dust filter 4 (described below) is to be cleaned, or the test sample is to be replaced, the lower portion electrode 32 is moved downwards by the air cylinder 34 and is placed on the outside of the internal space in the upper electrode 31.

In a state in which the heating furnace 3 has been opened in this way, the internal space inside the heating furnace 3 is in communication with a suction source P of a cleaning mechanism or the like. In this structure, when the lower portion electrode 32 moves to the open-furnace position and the heating furnace 3 is opened up, the interior of the heating furnace 3 is automatically suctioned so that any dust such as soot and the like that is adhering to the upper portion electrode 31 and the lower portion electrode 32 and the like is collected.

Hereinafter, structure relating to a suction operation in the heating furnace 3 will be described in detail.

The lower portion electrode 32 is supported by a supporting body 33 having a bottom surface portion that is formed having a flat, rectangular parallelepiped shaped outline. A piston rod 35 of the air cylinder 34 is connected to an outer side of this supporting body 33, and the lower portion electrode 32 is moved between the closed-furnace position and the open-furnace position as a result of the supporting body 33 being moved in an up-down direction by the air cylinder 34.

A first port SP1 and a second port SP2 through which a working fluid in the form of compressed air is able to flow in or flow out are formed in a side surface of a cylinder 36 of the air cylinder 34. In a case in which compressed air is flowing in through the first port SP1, the piston rod 35 is drawn back into the cylinder 36. In a case in which compressed air is flowing in through the second port SP2, the piston rod 35 is pushed to the outside of the cylinder 36. In other words, within the cylinder 36, a first chamber that communicates with the first port SP1 and a second chamber that communicates with the second port SP2 are mutually demarcated by the piston rod 35. The distance that the piston rod 35 is pushed out from the cylinder 36 is controlled by altering the pressure differential between the first chamber and the second chamber using this inflow and outflow of compressed air. In the present embodiment, a supply source for the compressed air and the first port SP1 are connected together by a first supply line SL1, while this supply source and the second port SP2 are connected together by a second supply line SL2. Control such as determining whether to supply compressed air from the supply source to the first port SP1 or to the second port SP2, as well as the quantity of compressed air to be supplied is performed by a compressed air control mechanism provided in the supply source. Note that this compressed air control mechanism is formed so as to perform operations that are prescribed in advance, for example, in accordance with a furnace-opening command or a furnace-closing command for the heating furnace 3 that is input from a mode setter C2.

Figure 3:
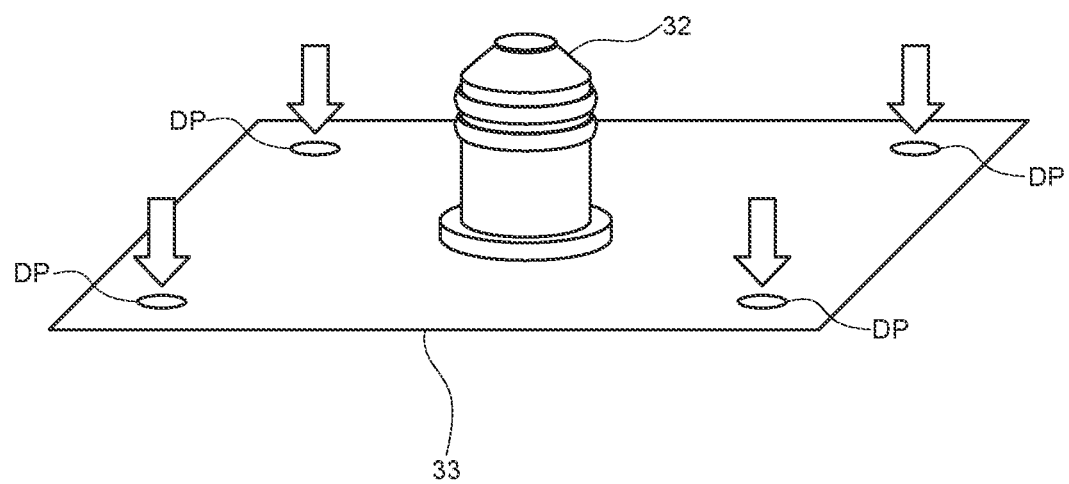
FIG. 3 is a schematic perspective view showing a peripheral structure around a lower portion electrode (i.e., a second electrode) according to the same embodiment.

Moreover, as is shown in FIG. 3, a plurality of dust suction ports DP through which dust is suctioned are provided in a furnace-interior side surface of the bottom surface portion of the supporting body 33. More specifically, the lower portion electrode 32 is supported in the center of the bottom surface portion of the supporting body 33, and the respective dust suction ports DP are formed in each of the four corners thereof. In addition, as is shown in FIG. 2, a dust suction flow path DL that is equipped with the above-described dust suction ports DP is formed in an interior portion of the supporting body 3.

In the present embodiment, an ejector 37 is provided on the dust suction flow path DL that is formed within the supporting body 33 so that the inner portion side of the heating furnace 3 and an intake port VP are connected together. In addition, a drive port AP of the ejector 37 and the first supply line SL1 are connected together by a drive line AL that branches off from the first supply line SL1. In other words, a structure is employed in which, when compressed air is supplied from the compressed air supply source to the first port SP1 of the air cylinder 34, then in parallel with this, compressed air is also supplied to the drive port AP of the ejector 37. In addition, a discharge port EP of the ejector 37 is connected to an exhaust side of the dust suction flow path DL where, for example, a dust box or the like is located.

Figure 4:
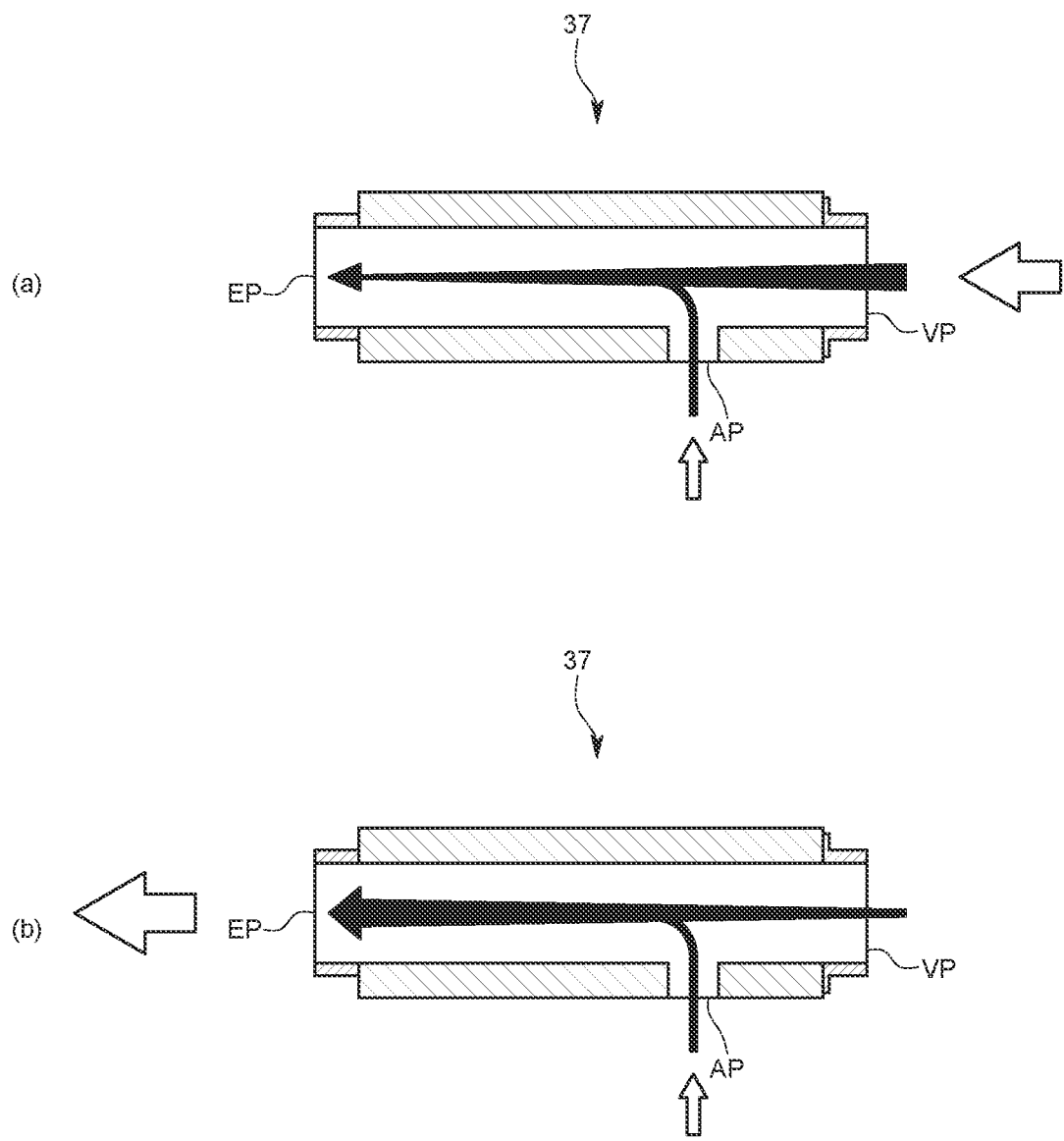
FIG. 4 is a schematic cross-sectional view showing a structure of an ejector according to the same embodiment.

A more detailed description of the ejector 37 of the present embodiment will now be given. As is shown in FIG. 4, the ejector 37 is formed having a circular-cylinder shaped configuration having the intake port VP formed at one end surface thereof, and the discharge port EP formed at another end surface thereof. Moreover, the drive port AP through which compressed air, which is serving as a working fluid, is able to flow in is formed in a side surface of the ejector 37. The drive port AP communicates with a nozzle (not shown in the drawings) that is formed in an internal portion of the ejector 37 and, as is shown in FIG. 4 (a), gas is suctioned through the intake port VP by the air decompression that is generated as a result of the compressed air passing through the nozzle. In addition, the compressed air flowing in through the drive port AP and the gas taken in through the intake port VP are discharged to the outside through the discharge port EP in a state of being mixed together. Here, the flow rate of the mixture gas discharged through the discharge port EP is, for example, approximately 3-4 times the flow rate of the compressed air flowing in through the drive port AP. In other words, the flow rate of the gas taken in through the intake port VP is approximately 2-3 times the flow rate of the compressed air flowing in through the drive port AP. In this way, by causing compressed air to flow in through the drive port AP, the ejector 37 is able to generate suction force in the intake port VP, and cause dust to be suctioned from inside the heating furnace 3 through the dust suction ports DP.

Next, a description will be given of each of the devices provided on the outflow path L2.

As is shown in FIG. 1, the dust filter 4 through which the mixture gas led out from the heating furnace 3 flows in, and an analysis mechanism AM that detects either one or a plurality of predetermined components contained in the mixture gas passing through the dust filter 4 are provided on the outflow path L2. In the present embodiment, the analysis mechanism AM includes a CO detection portion 5, an oxidizer 6, a $CO_2$ detection portion 7, an $H_2O$ detection portion 8, a removal mechanism 9, a mass flow controller 10, and an $N_2$ detection portion 11 which is serving as a thermal conductivity analysis portion. These devices are each arranged on the outflow path L2 in the above sequence from the upstream side. In addition, a cleaning gas supply mechanism R that supplies cleaning gas to the dust filter 4 in the opposite direction from the direction in which the mixture gas is flowing is also provided on the outflow path L2. The cleaning gas supply mechanism R is formed so as to supply cleaning gas to the dust filter 4 via an exhaust flow path L3 that branches off from a point between the dust filter 4 and the CO detection portion 5 which is located furthest to the upstream side in the analysis mechanism AM.

Each of the aforementioned portions will now be described in detail.

Figure 8:
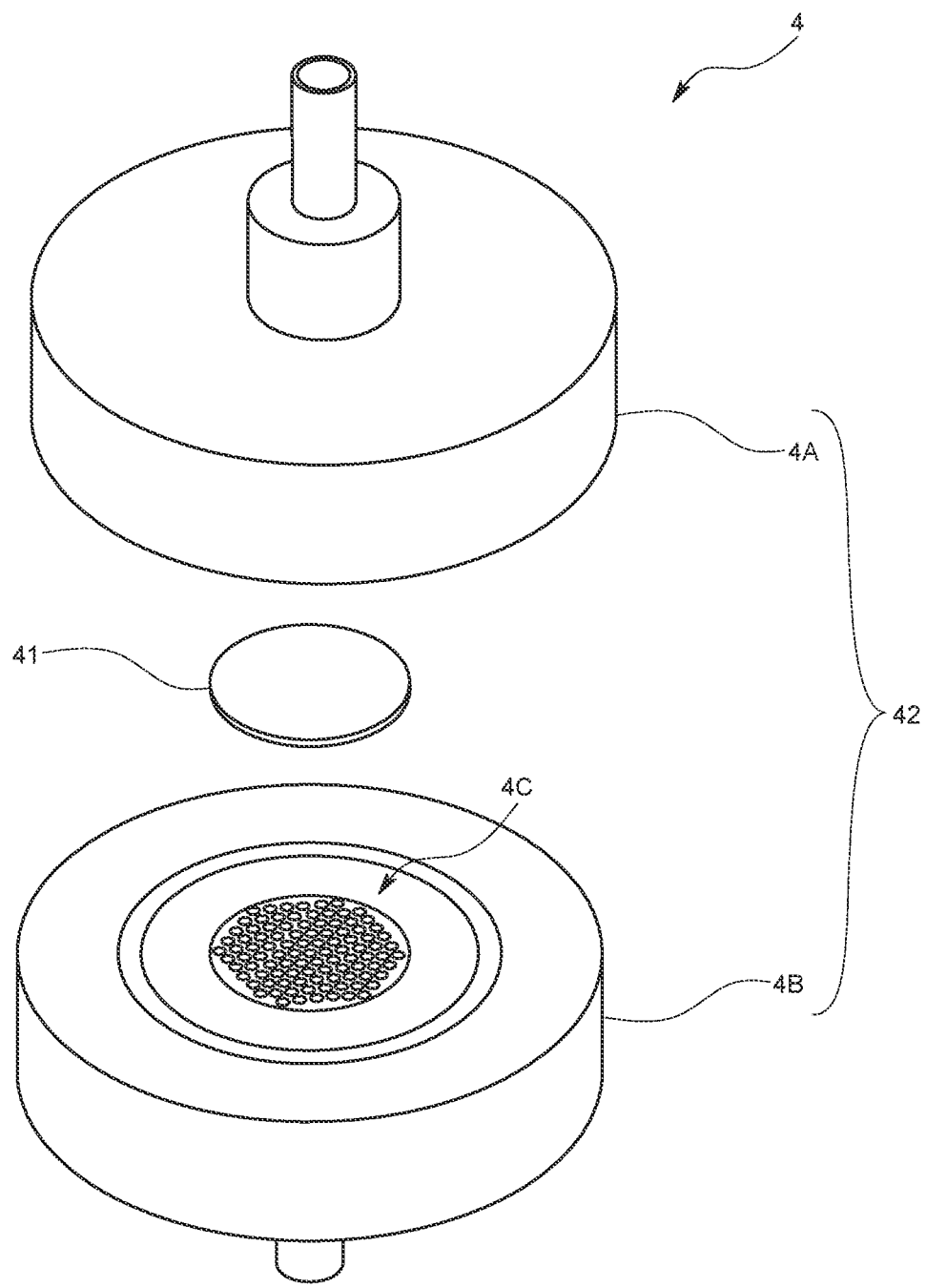
FIG. 8 is a schematic perspective view showing a structure of a dust filter according to the same embodiment.

The dust filter 4 filters out and removes dust such as soot and the like that is contained in the mixture gas. As is shown in FIG. 8, the dust filter 4 is provided with a membrane filter 41 made, for example, from PTFE or the like, and with a filter holder 42 that holds the membrane filter 41 by sandwiching it in the thickness direction thereof. The filter holder 42 is formed as a flange fitting on the outflow path L2, and is formed by an upstream-side holder 4A and a downstream-side holder 4B that are each formed having a substantially circular-disk shaped configuration. A mesh sheet screen 4C is formed in a central portion of the downstream-side holder 4B, and the membrane filter 41 is placed on this sheet screen 4C so as to be sandwiched between the sheet screen 4C and the upstream-side holder 4A. Note that the upstream-side holder 4A and the downstream-side holder 4B are fastened together via their respective outer circumferential portions by means of nuts and bolts (not shown in the drawings). The filter holder 42 is formed from a transparent resin such as, for example, an acrylic resin or the like so that it is possible to observe the state of the membrane filter 41 from the outer side of the filter holder 42.

Figure 5:
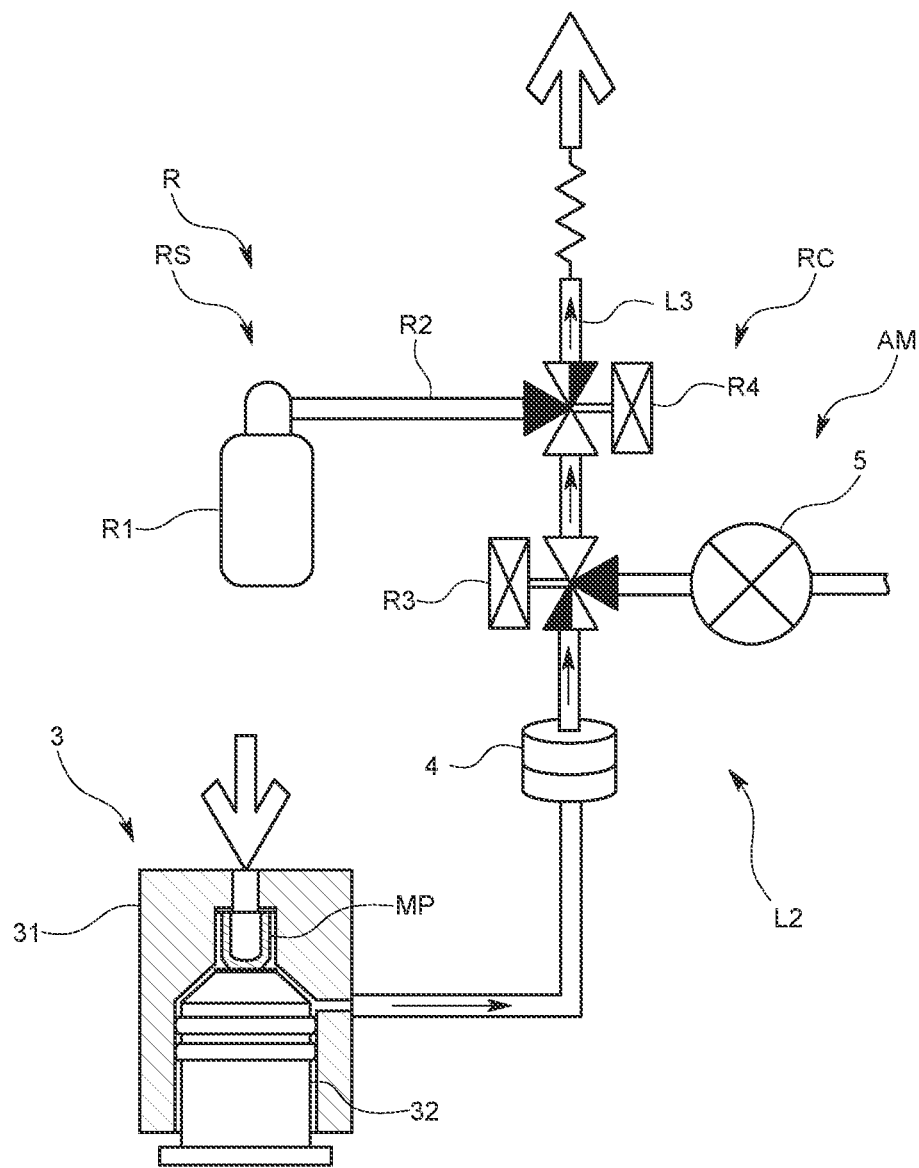
FIG. 5 is a schematic view showing an enlargement of a periphery of a cleaning gas supply mechanism at a time when gas is being exhausted according to the same embodiment.
Figure 6:
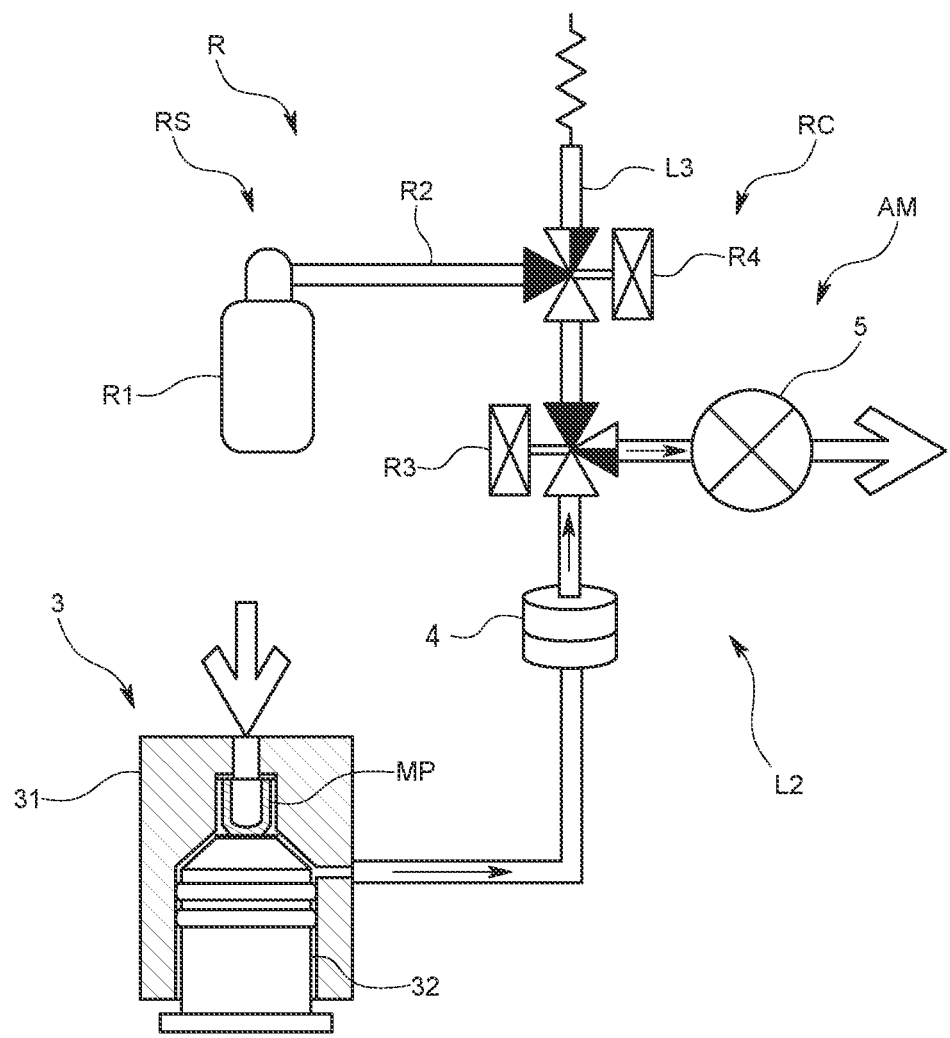
FIG. 6 is a schematic view showing an enlargement of the periphery of the cleaning gas supply mechanism at a time when measurements are being made according to the same embodiment.
Figure 7:
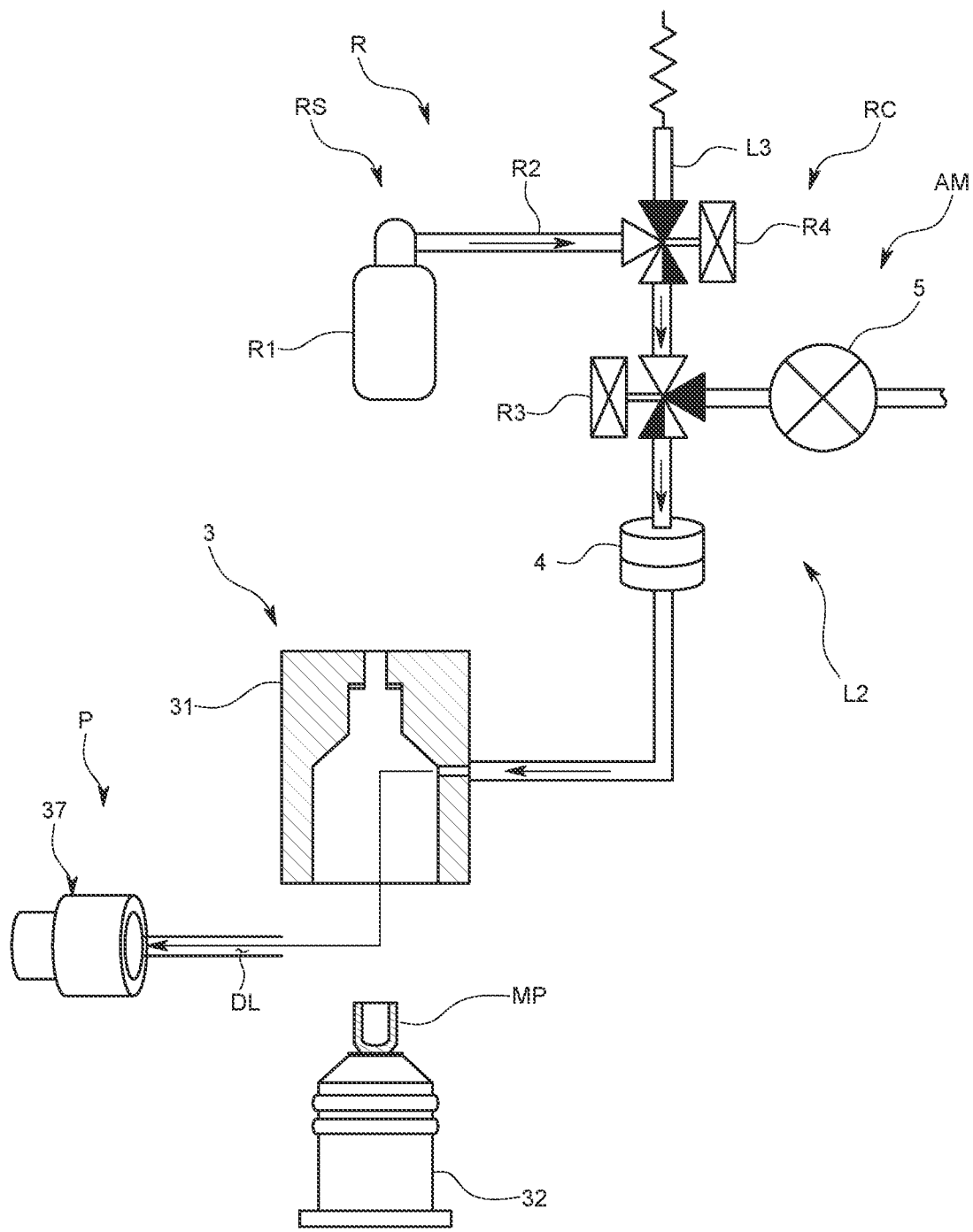
FIG. 7 is a schematic view showing an enlargement of the periphery of the cleaning gas supply mechanism at a time when analysis is being performed according to the same embodiment.

As is shown in FIG. 5 through FIG. 7, the cleaning gas supply mechanism R is formed so as to blow opposing jets of cleaning gas at a predetermined pressure or greater onto the dust filter 4 from the exhaust flow path L3 that branches off from a point on the outflow path L2 between the dust filter 4 and the CO detection portion 5. In other words, the cleaning gas supply mechanism R is provided with a cleaning gas supply portion RS that supplies cleaning gas to the exhaust flow path L3, and with a flow path switching portion RC that is formed by two switching valves. This flow path switching portion RC is controlled, for example, by the mode setter C2, and the points to which the respective switching valves are connected are altered in accordance with the mode that has been set.

The cleaning gas supply portion RS is provided with a cleaning gas supply source R1 that blows jets of, for example, an inert gas as the cleaning gas at a predetermined pressure, and with a cleaning gas supply flow path R2 that connects the cleaning gas supply source R1 and the exhaust flow path L3 together. The cleaning gas supply flow path R2 is provided so as to merge with the exhaust flow path on the upstream side from a capillary that is provided on the downstream-end side thereof. Here, it is preferable that the inert gas blown from the inert gas supply source R1 is not able to be detected by the analysis mechanism AM and, for example, He, which is also used as the carrier gas in the present embodiment, may be used. If this type of cleaning gas is used, then even if residual cleaning gas components remain in the dust filter 4 or the first 3-way valve R3 (described below) on the outflow path L2, it is difficult for these to have any effect on the accuracy of the analysis. Note that, depending on the desired analysis accuracy or on the type of element being measured, it may also be possible for Ar or $N_2$, which are different components from the carrier gas, to be used as the inert gas.

The flow path switching portion RC is provided with a first 3-way valve R3 that is provided at the branching point where the exhaust flow path L3 branches off from the outflow path L2, and with a second 3-way valve R4 that is provided at the merging point where the exhaust gas supply flow path R2 merges with the exhaust flow path. As is shown in FIG. 2 through FIG. 4, by switching the states of the first 3-way valve R3 and the second 3-way valve R4, it is possible to alter the type of gas that is flowing and also the direction in which the gas is flowing. In other words, by switching the flow path switching portion RC, any of an exhaust mode shown in FIG. 5, an analysis mode shown in FIG. 6, or a cleaning mode shown in FIG. 7 can be set.

In the exhaust mode shown in FIG. 5, the first 3-way valve R3 places the outflow path L2 and the exhaust flow path L3 in mutual communication with each other and also closes off the analysis mechanism AM side of the outflow path L2, and the second 3-way valve R4 closes the cleaning gas supply flow path R2. As a result, mixture gas that is led out from the heating furnace 3 is exhausted via the exhaust flow path L3 without passing through the analysis mechanism AM. The exhaust mode is employed in order to enable heat to be applied to the crucible MP without a test sample having been placed therein, so that any impurities contained in the crucible MP are vaporized and exhausted to the outside via the exhaust flow path L3 without entering the analysis mechanism AM.

In the analysis mode shown in FIG. 6, the first 3-way valve R3 closes the exhaust flow path L3, and allows mixture gas to flow into the analysis mechanism AM. The analysis mechanism AM measures the concentrations of various components in the inflowing mixture gas.

In the cleaning mode shown in FIG. 7, the first 3-way valve R3 places the outflow path L2 and the exhaust flow path L3 in mutual communication with each other and closes off the analysis mechanism AM side of the outflow path L2. Moreover, the second 3-way valve R4 places the exhaust flow path L3 and the cleaning gas supply flow path R2 in mutual communication with each other and closes off the exit-side of the exhaust flow path L3. In addition, in the heating furnace 3, the lower portion electrode 32 is lowered downwards, and cleaning gas that has been blown from the cleaning gas supply source R1 flows in reverse through the dust filter 4, and thereafter a flow path is formed extending from inside the heating furnace 3 to a suction source P. If cleaning gas is supplied to the dust filter 4 in this cleaning mode, then dust such as soot and the like that has collected on the upstream-side surface of the membrane filter 41 in the dust filter 4 is made to flow into the heating furnace 3. The cleaning gas and dust that have flowed into the heating furnace 3 are then suctioned out by the suction source P so that a state of cleanliness is maintained within the heating furnace 3.

Next, the analysis mechanism AM will be described in detail with reference to FIG. 1.

The CO detection portion 5 detects CO (carbon monoxide) contained in the mixture gas passing through the dust filter 4 and measures the concentration of this CO, and is formed by an NDIR (non-dispersive infrared gas analyzer). From the standpoint of measurement accuracy, this CO detection portion 5 operates most effectively in cases in which there is a high concentration of oxygen contained in the test sample. More specifically, it is preferable that a concentration of not less than 150 ppm of CO be measured.

The oxidizer 6 oxidizes CO and $CO_2$ contained in the mixture gas that has passed through the CO detection portion 5, and also generates water vapor by oxidizing $H_2$ into $H_2O$ (i.e., water). In the first embodiment, copper oxide is used as the oxidizer 6, and the temperature of the oxidizer is held to a temperature of not more than 450° C. by a heat element provided around the oxidizer.

The $CO_2$ detection portion 7 is an NDIR that detects $CO_2$ in the mixture gas that has passed through the oxidizer 6, and measures the concentration thereof. From the standpoint of measurement accuracy, this $CO_2$ detection portion 7 operates most effectively in cases in which there is a low concentration of oxygen contained in the test sample (for example, less than 150 ppm).

The $H_2O$ detection portion 8 is an NDIR that detects $H_2O$ in the mixture gas that has passed through the $CO_2$ detection portion 7, and measures the concentration thereof. Note that the flow path from the oxidizer 6 to the $H_2O$ detection portion 8 is formed in such a way that the temperature of the mixture gas is held at 100° C. or more, and such that the $H_2O$ is maintained in a water vapor state. In this way, measurement errors caused by condensation are prevented from occurring in the $H_2O$ detection portion 8.

The removal mechanism 9 employs adhesion to remove $CO_2$ and $H_2O$ contained in the mixture gas. The removal mechanism 9 is formed by an adhesive agent and, for example, the same material as that used for the above-described purifier 2 provided on the inflow path L1 may be used. Accordingly, for example, a zeolite-based molecular sieve may be used as the adhesive agent forming the removal mechanism 9. Additionally, it is also possible for silica gel, activated carbon, or Ascarite or the like to be used as the material forming the removal mechanism 9.

The mass flow controller 10 is a flow rate control device in which a flow rate sensor, a control valve, and a flow rate controller (none of these are shown in the drawings) have been packaged into a single device. This mass flow controller 10 supplies mixture gas at a constantly maintained set flow rate to the $N_2$ detection portion 11 located on the downstream side thereof.

The $N_2$ detection portion 11 is a TCD (thermal conductivity detector) that measures changes in the thermal conductivity of the mixture gas, and also measures the concentration of $N_2$, which is a predetermined component contained in the mixture gas, from the flow rate of the mixture gas being supplied. In other words, because the mixture gas supplied to the $N_2$ detection portion 11 is substantially formed solely by a carrier gas and $N_2$, the concentration of the $N_2$ contained in the mixture gas is a value that corresponds to changes in the thermal conductivity. Moreover, in the first embodiment, no flow rate meter is provided on the downstream side from the $N_2$ detection portion 11, and the downstream side of the $N_2$ detection portion 11 is directly connected to the exhaust port of the outflow path L2.

An analysis flow of the elemental analysis device 100 that is formed in the above-described manner will now be described with reference to FIG. 1.

Direct current is supplied to the crucible MP containing a test sample inside the heating furnace 3 so as to heat the crucible MP by means of energization. While this heating is being performed, carrier gas is continuously supplied from the inflow path L1 in such a way as to ensure that the differential pressure within the heating furnace 3 is raised not more than 60 kPa relative to the atmospheric pressure and is maintained at this pressure. The sample gas that is generated by thermal decomposition and reduction inside the heating furnace 3 is led out by the carrier gas to the outflow path L2.

A mixture gas made up of the sample gas and the carrier gas led out from the heating furnace 3 passes through the dust filter 4, and is then guided to the CO detection portion 5. Here, the components that may possibly be contained in the sample gas guided to the CO detection portion 5 are CO, $H_2$, and $N_2$. The concentration of CO is measured in the CO detection portion 5.

Next, the mixture gas that has passed through the CO detection portion 5 is guided to the oxidizer 6. Here, CO contained in the mixture gas is oxidized to $CO_2$, and the $H_2$ is oxidized to $H_2O$. Accordingly, the components that may possibly be contained in the sample gas that has passed through the oxidizer 6 are $CO_2$, $H_2O$, and $N_2$.

The mixture gas that has passed through the oxidizer 6 is guided to the $CO_2$ detection portion 7. The concentration of $CO_2$ contained in the mixture gas is then measured by the $CO_2$ detection portion 7.

The mixture gas that has passed through the $CO_2$ detection portion 7 is guided to the $H_2O$ detection portion 8, and the concentration of $H_2O$ contained in the mixture gas is then measured.

The mixture gas that has passed through the $H_2O$ detection portion 8 is guided to the removal mechanism 9. In the removal mechanism 9, because $CO_2$ and $H_2O$ are removed by adhesion, the only component that may possibly be contained in the sample gas that has passed through the removal mechanism 9 is $N_2$.

The mixture gas that has passed through the removal mechanism 9 is guided, while being held at a constantly maintained set flow rate, to the $N_2$ detection portion 11 by the mass flow controller 10. In the $N_2$ detection portion 11, the concentration of $N_2$ is measured.

Measurement signals showing the concentrations of the respective components obtained by the respective detection portions are input into the measurement value calculation portion C1. Based on the respective measurement signals, the measurement value calculation portion C1 calculates the concentrations of O, H, and N contained in the test sample. Note that when the measurement value calculation portion C1 is calculating the concentration of oxygen contained in the test sample, in a case in which the oxygen concentration within the test sample is equal to or greater than a predetermined threshold value (150 ppm), then the oxygen concentration obtained by the CO detection portion 5 is set as the output value, while in a case in which the oxygen concentration within the test sample is less than a threshold value, then the oxygen concentration obtained by the $CO_2$ detection portion 7 is set as the output value.

According to the elemental analysis device 100 that is formed in the above-described manner, because, as a result of the cleaning mode being executed, cleaning gas is blown onto the dust filter 4 by the cleaning gas supply mechanism R in the opposite direction from the direction in which the mixture gas flows when the device is in analysis mode, it is possible to desorb collected dust such as soot and the like and restore the functioning of the dust filter without having to remove the membrane filter 41 from the filter holder 42. Because of this, it is possible to greatly increase the number of times elemental analysis can be performed without the membrane filter 41 having to be replaced, and to thereby reduce frequency of performing maintenance as well as the time and labor required for such maintenance.

Moreover, because the dust filter 4 uses the membrane filter 41, dust such as soot and the like is deposited almost entirely solely on the heating furnace 3-side surface of the membrane filter 41. Accordingly, by supplying cleaning gas towards the heating furnace 3 side of the membrane filter 41, any collected dust such as soot and the like is substantially prevented from flowing onto the analysis mechanism AM side thereof, and is instead returned to the heating furnace 3 side where it is recovered by the suction source P. As a result, this cleaning mode enables the analysis accuracy of the analysis mechanism AM to be maintained even when the membrane filter has been restored.

Furthermore, by employing this membrane filter 41, compared to a case in which quartz wool or the like is used as a filter, it is difficult for any dust or any of the material forming the filter itself to flow onto the analysis mechanism AM side. In addition, even in cases when repeated analyses are performed so that there such a reduction in the performance of the membrane filter 41 that the membrane filter 41 cannot be restored by implementing the cleaning mode, the membrane filter can be replaced easily by simply inserting and sandwiching a new membrane filter in the filter holder 42. Because of this, it is easy to prevent dust such as soot and the like from leaking onto the analysis device side due to poor maintenance.

Furthermore, as is shown in FIG. 2 (b), if compressed air is supplied to the first port SP1 of the air cylinder 34 in order to move the lower portion electrode 32 to the open-furnace position, then compressed air is also supplied to the drive port AP of the ejector 37 as well. Accordingly, without operating separate cleaning devices and the like, it is possible to suction dust from inside the heating furnace 3 via the dust suction ports DP at the same time as the heating furnace 3 is being opened. Accordingly, it is possible to prevent the interior of the heating furnace 3 from being contaminated by dust as a result of this opening operation.

Moreover, simply by providing the ejector 37 on the dust suction flow path DL, and connecting the first supply line SL1, which causes the air cylinder 34 to operate, to the drive port AP of the ejector 37 by means of the drive line AL, it is possible to suction the interior of the heating furnace 3 in conjunction with the operation to open the heating furnace 3. Accordingly, there is no need to employ a high-level controller in order to link the opening and closing operations with the suctioning of the interior of the heating furnace 3. Moreover, because it is possible to use a common motive power source to operate both the air cylinder 34 and the ejector 37, any dust within the heating furnace 3 can be collected using a simple structure.

In addition, even without increasing the flow rate of the compressed air supplied to the drive port AP to any considerable degree, because the ejector 37 is used it is still possible to achieve sufficient suction force to suction out dust from inside the heating furnace 3.

Additional embodiments of the present invention will now be described.

The dust filter that is employed is not restricted to being a membrane filter. For example, a membranous filter made from a material other than resin, or a filter created by filling a vessel with quartz wool may also be used. Even if filters such as these are used, dust collected by the cleaning gas supply mechanism can still be desorbed and the functioning of the filter can be restored, so that the frequency of performing maintenance, as well as the time and labor required for such maintenance, can be reduced.

Moreover, it is also possible to provide a vibrator that imparts a vibration to the dust filter, and to then cause the dust filter to vibrate when the dust filter is in cleaning mode. In other words, cleaning gas can be supplied to the dust filter after the dust filter has been made to vibrate so as to make it easier for the dust to be desorbed.

Figure 9:
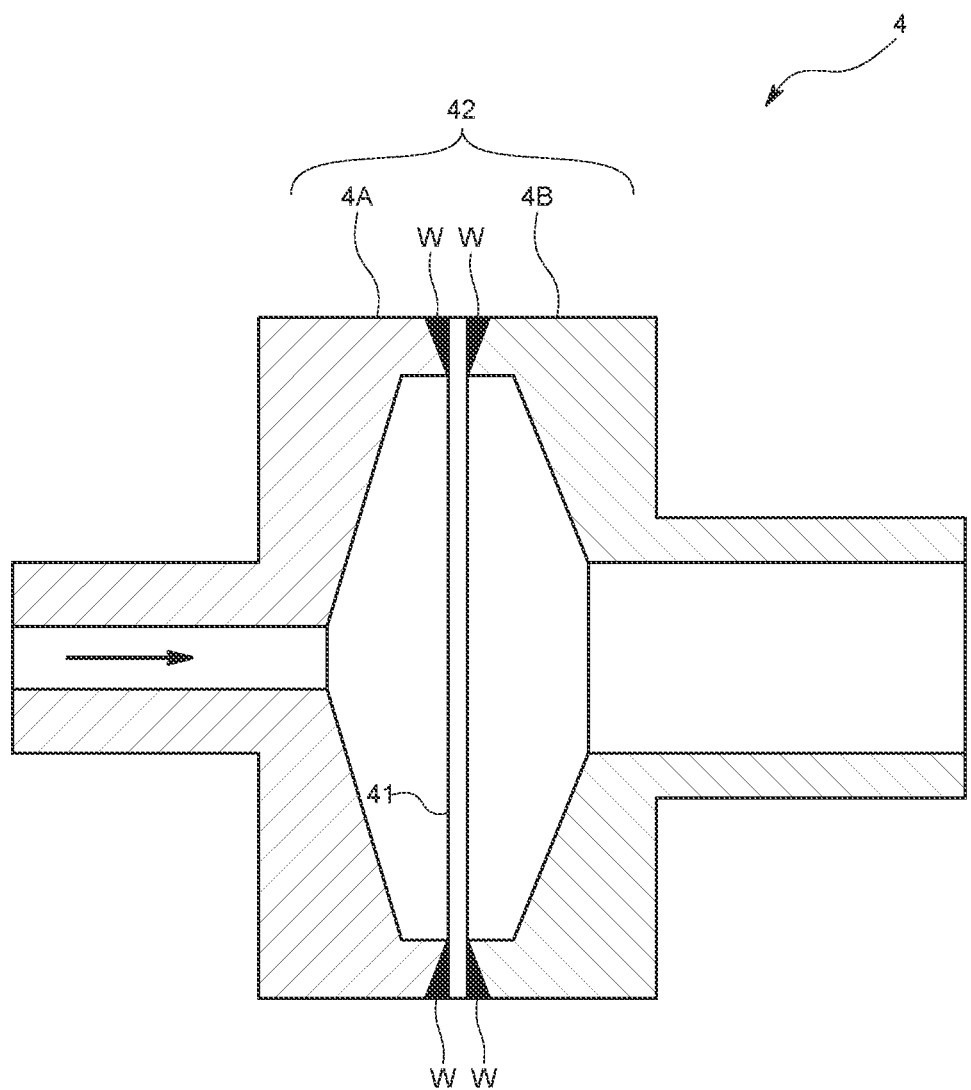
FIG. 9 is a schematic cross-sectional view showing a variant example of a dust filter.
Figure 10:
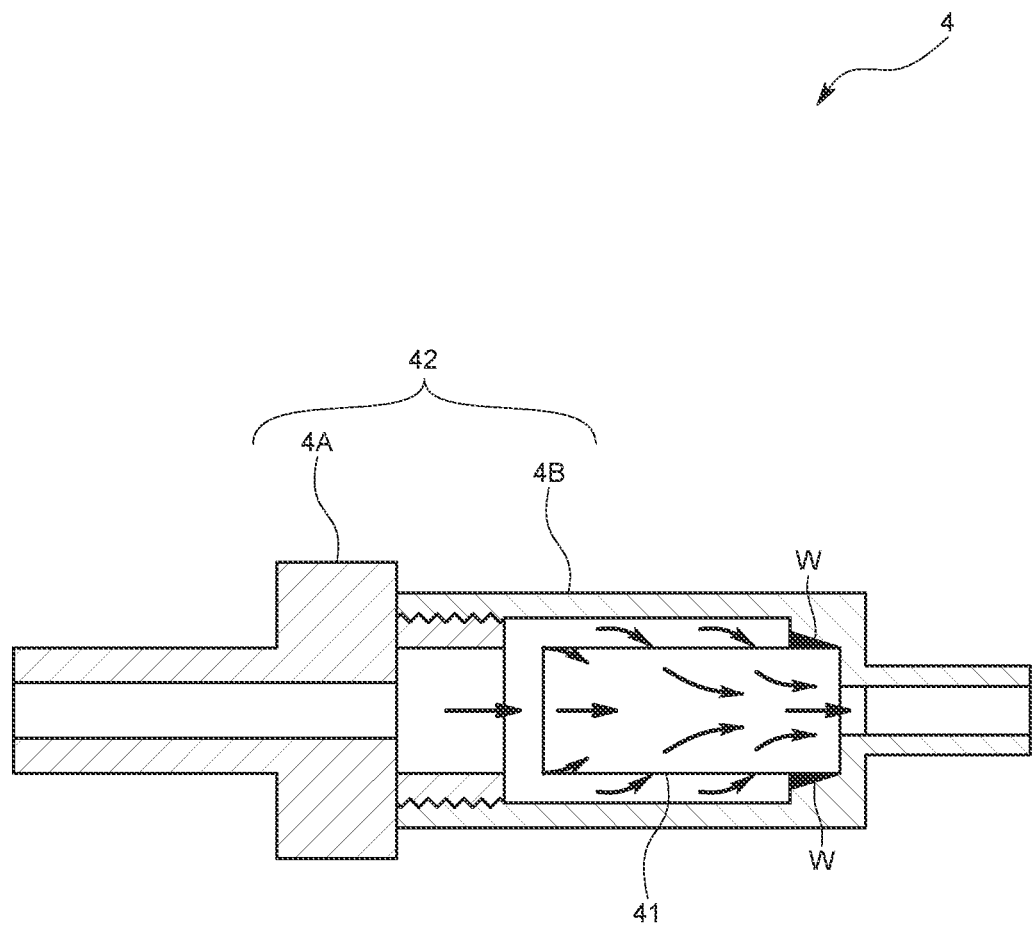
FIG. 10 is a schematic cross-sectional view showing another variant example of a dust filter.

The filter holder that is used to hold the membrane filter is not restricted to the object described in the foregoing embodiment. For example, it is also possible for the filter holder to be made out of metal. More specifically, as is shown in FIG. 9, it is also possible for a metal filter 41 to be used in the dust filter 4. In other words, the dust filter 4 may be formed by sandwiching an outer circumferential portion of a thin, circular-plate shaped metal filter 41 between an upstream-side holder 4A and a downstream-side holder 4B that are each formed from metal so as to have a flange-shaped configuration, and by then fixing these together via welds W. Alternatively, as is shown in FIG. 10, instead of using a thin, circular-plate shaped filter, it is possible to use a metal mesh filter 41 that is formed in a circular-cylinder shape. In a case such as this, in order to ensure that an adequate backwashing effect can be produced by the cleaning gas, the metal mesh filter 41 may be fixed by welds W to the downstream-side holder 4B. In particular, in a case in which both the metal filter 41 and the metal mesh filter 41 are used, it is possible to eliminate the actual task of replacing the filter, so that the frequency at which maintenance needs to be performed can be greatly reduced.

Figure 11:
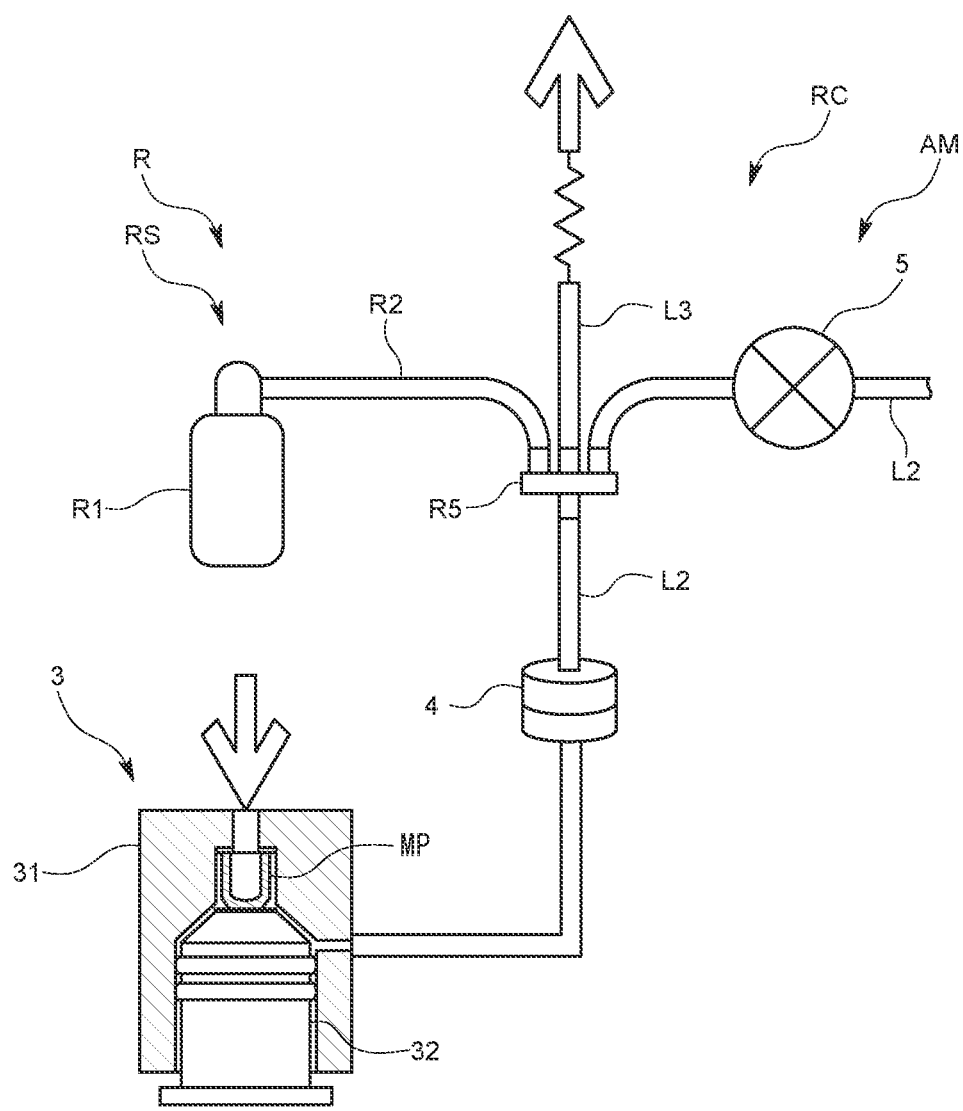
FIG. 11 is a schematic view showing an enlargement of a periphery of a cleaning gas supply mechanism according to another embodiment of the present invention.

Any cleaning gas supply mechanism may be employed provided that it be able to blow cleaning gas onto the dust filter in the opposite direction from the direction in which the mixture gas is flowing. For example, it is possible to use a cleaning gas supply mechanism that, instead of supplying cleaning gas via the exhaust flow path, supplies cleaning gas directly to the portion of the outflow path between the dust filter and the analysis mechanism. In addition, the flow path switching portion that is used to form part of the cleaning gas supply mechanism may be provided with only a single switching valve. For example, as is shown in FIG. 11, using a single 4-way valve R5, it is possible to employ a structure in which any one of the analysis mechanism AM side of the outflow path L2, the exhaust flow path L3, or the cleaning gas supply flow path R2 may be connected to the heating furnace 3 side of the outflow path L2.

Figure 12:
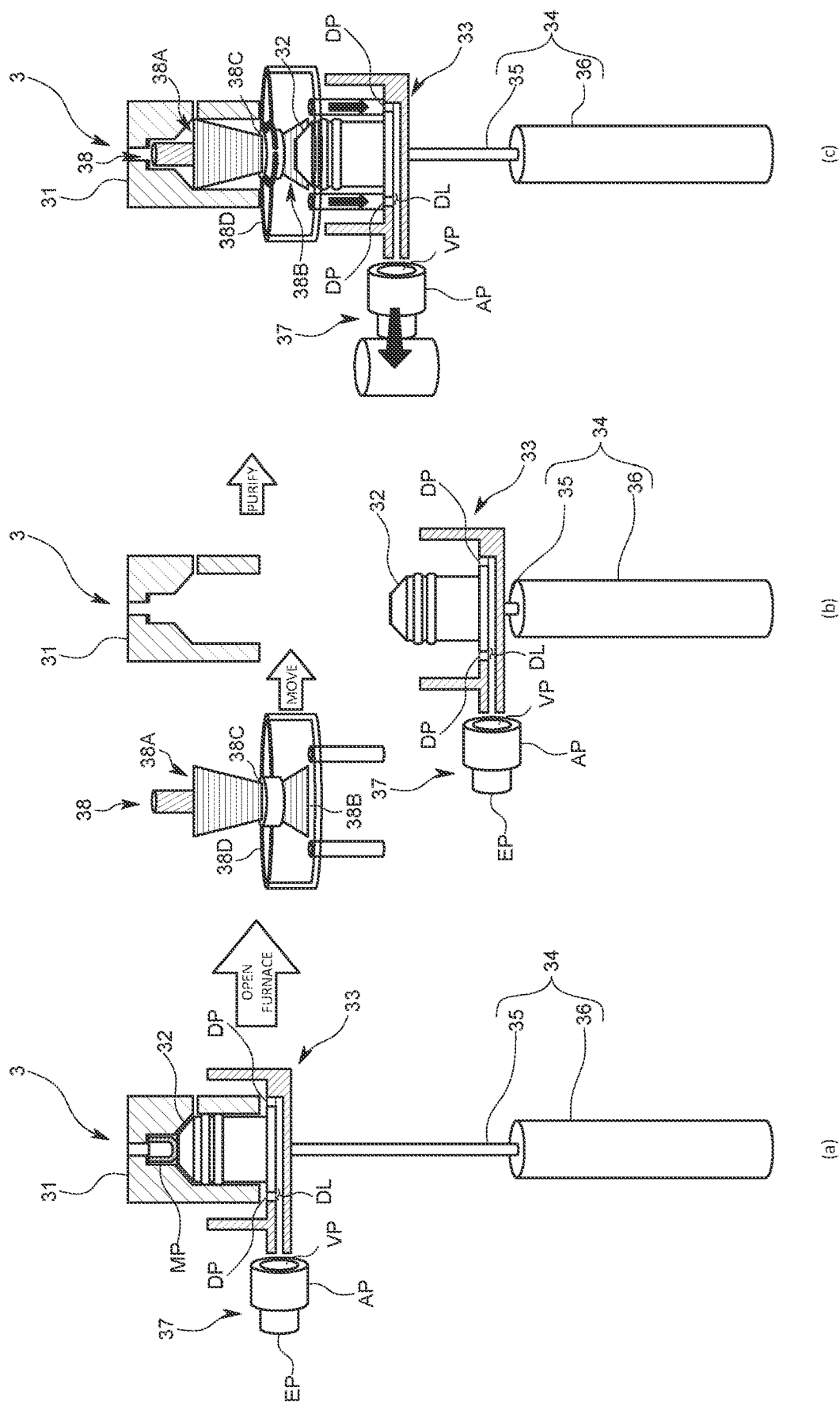
FIG. 12 is a schematic view showing a heating furnace and peripheral structure around this heating furnace according to yet another embodiment of the present invention.

As is shown in FIG. 12, it is also possible to further provide a cleaning mechanism 38 that, in a case in which the lower portion electrode 32 is placed in the open-furnace position, is formed so as to move between the upper portion electrode 31 and the lower portion electrode 32 and brush dust from the upper portion electrode 31 or the lower portion electrode 32. This cleaning mechanism 38 is provided with an upper portion brush 38A that, when placed inside the heating furnace 3, is in contact with the upper portion electrode 31, a lower portion brush 38B that, when placed inside the heating furnace 3, is in contact with the lower portion electrode 32, an actuator 38C that causes the upper portion brush 38A and the lower portion brush 38B to rotate, and a dust collection vessel 38D that is located so as to be in communication with the respective dust suction ports DP, and so as to receive the dust brushed from the upper portion brush 38A or the lower portion brush 38B. If this type of cleaning mechanism 38 is employed, then the dust brushed from the upper portion brush 38A or the lower portion brush 38B can be rapidly collected via the dust suction flow path DL before it is able to contaminate the surrounding portions.

Moreover, it is also possible to employ a structure that, in a state in which, as is shown in FIG. 12 (c), the interior of the heating furnace 3 is being cleaned by the cleaning mechanism 38, creates a backwash by supplying cleaning gas to the dust filter 4, and supplies a working fluid to the drive port AP of the ejector 37 so that dust that has become detached from the dust filter 4 and traveled into the heating furnace 3 can be collected from the dust suction flow path DL. If this type of structure is employed, then it is possible to efficiently collect the detached dust while simultaneously cleaning both the interior of the heating furnace 3 and the dust filter 4.

As is described above, the timing when compressed air, which is serving as a working fluid, is supplied to the drive port AP of the ejector 37 is not restricted to the timing when the lower portion electrode 32, which is serving as the second electrode, moves to the open-furnace position, and may instead be the timing when the dust filter 4 is backwashed, or may be another timing. Moreover, the cleaning gas that is used for back-washing the dust filter 4 may also be compressed air that is supplied from the same supply source as that used for the working fluid supplied to the ejector. This enables the same gas to be used in common for all operations relating to cleaning in the elemental analysis device, and thereby enables the structure to be further simplified.

In the above-described embodiments, the purifier may be formed from heated copper oxide/reduced copper, and a $CO_2/H_2O$ desorption agent may be provided on the downstream side thereof between the purifier and the heating furnace on the inflow path. In addition, the removal mechanism is not restricted to mechanisms that remove $CO_2$ and $H_2O$ by means of adsorption, and mechanisms that remove $CO_2$ and $H_2O$ by means of a chemical reaction using a reagent may also be employed.

The elemental analysis device is not restricted to devices that measure oxygen (O), hydrogen (H), and nitrogen (N) as elements. In other words, the analysis mechanism may also be a mechanism that only measures hydrogen (H). More specifically, the elemental analysis device may be one that uses Ar as the carrier gas, and in which a dust filter, an oxidizer, a removal mechanism, a separation column, a mass flow controller, and an $H_2$ detection portion, which is serving as a thermal conductivity analysis portion, are provided in the above sequence from the upstream side of the outflow path. Moreover, in this type of embodiment, a room-temperature oxidizing agent may be used as the oxidizer, and a removal mechanism that uses an adsorption agent to remove only $CO_2$ may be used as the removal mechanism. In addition, an analysis device that includes carbon (C) as an analysis subject may also be used.

The analysis mechanism is not restricted to that described in the foregoing embodiments. For example, instead of a mass flow controller, it is also possible to provide a needle valve and to thereby maintain a constant aperture. Furthermore, the analysis mechanism may be one that detects a plurality of components, or may be one that detects only a single component.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the present invention, it is possible to provide an elemental analysis device that enables the dust filter replacement frequency to be reduced, and enables the time and labor required for maintenance performed by a user to also be reduced.

What is claimed is:

1. An elemental analysis device comprising:
a heating furnace in which a test sample that is placed in a crucible is heated so that a sample gas is generated from the test sample;
an inflow path through which a carrier gas is introduced into the heating furnace;
an outflow path through which a mixture gas made up of the carrier gas and the sample gas is led out from the heating furnace;
a dust filter that is provided on the outflow path;
an analysis mechanism that is provided on the outflow path on a downstream side from the dust filter, and that detects one or a plurality of predetermined components contained in the mixture gas;
a cleaning gas supply mechanism that supplies cleaning gas to the dust filter in an opposite direction from a direction in which the mixture gas is flowing;
an exhaust flow path that branches off from between the dust filter and the analysis mechanism on the outflow path, and through which the gas that has passed through the dust filter is exhausted, wherein
the cleaning gas supply mechanism comprises:
a flow path switching portion that is equipped with at least a switching valve that is disposed on a branch point between the outflow path and the exhaust flow path, and that switches flow paths in such a way that cleaning gas flows in an opposite direction from a direction in which the mixture gas is flowing along the outflow path; and
a cleaning gas supply portion that supplies cleaning gas to the exhaust flow path or to the switching valve.

2. The elemental analysis device according to claim 1, wherein
the cleaning gas supply portion comprises:
a cleaning gas supply source that blows out cleaning gas at a predetermined pressure; and
a cleaning gas supply flow path that connects the cleaning gas supply source to the exhaust flow path, and wherein
the flow path switching portion comprises:
a first 3-way valve which serves as the switching valve; and
a second 3-way valve that is disposed at a merging point where the exhaust flow path and the cleaning gas supply flow path merge.

3. The elemental analysis device according to claim 1, wherein
the cleaning gas supply portion comprises:
a cleaning gas supply source that blows out cleaning gas at a predetermined pressure; and
a cleaning gas supply flow path that connects the cleaning gas supply source to the exhaust flow path, and wherein
the flow path switching portion comprises:
a 4-way valve serving as the switching valve that switches flow paths in such a way that any one of the analysis mechanism side of the outflow path, the exhaust flow path, or the cleaning gas supply flow path is connected to the heating furnace side of the outflow path.

4. The elemental analysis device according to claim 1, wherein the dust filter comprises:
a membrane filter; and
a filter holder that holds the membrane filter by sandwiching the membrane filter in a thickness direction thereof.

5. The elemental analysis device according to claim 4, wherein the filter holder is formed from resin or glass.

6. The elemental analysis device according to claim 1, wherein the dust filter comprises:
a metal filter; and
a filter holder to which the metal filter is welded.

7. The elemental analysis device according to claim 1, wherein the heating furnace comprises:
a first electrode;
a second electrode that is formed so as to be able to move between a closed-furnace position where it sandwiches the crucible between itself and the first electrode, and an open-furnace position that is separated by a predetermined distance from the closed-furnace position;
a drive mechanism that causes the second electrode to move between the closed-furnace position and the open-furnace position;

a dust-suction flow path that opens in the interior of the heating furnace and is equipped with a dust-suction port that draws in dust; and an ejector that is equipped with an intake port that is connected to the heating furnace side of the dust-suction flow path, a discharge port that is connected to the discharge side of the dust-suction flow path, and a drive port to which a working fluid is supplied, wherein, the drive mechanism is formed in such a way that, in a case in which the drive mechanism moves the second electrode from the closed-furnace position to the open-furnace position, the working fluid flows into the drive port of the ejector.

8. The elemental analysis device according to claim 7, wherein the drive mechanism is a hydraulic cylinder that is equipped with a first port through which the working fluid either flows in or flows out, and is formed in such a way that, in a case in which the working fluid flows in through the first port, a piston rod is drawn in so that the second electrode is moved to the open-furnace position side, and is also formed in such a way that, in a case in which the working fluid flows into the hydraulic cylinder through the first port, the working fluid also flows into the ejector through the drive port.

9. The elemental analysis device according to claim 8, further comprising:

a first supply line that connects a supply source for the working fluid to the first port; and a drive line that branches off from the first supply line and is connected to the drive port.

10. The elemental analysis device according to claim 8, wherein the hydraulic cylinder is equipped with a second port through which the working fluid either flows in or flows out, and is formed in such a way that, in a case in which the working fluid flows in through the second port, a piston rod is pushed out so that the second electrode is moved to the closed-furnace position side.

11. The elemental analysis device according to claim 8, wherein the hydraulic cylinder is an air cylinder, and the working fluid is compressed air.

12. The elemental analysis device according to claim 8, further comprising a supporting body inside which is formed the dust suction flow path, and that supports the second electrode, wherein the piston rod of the hydraulic cylinder is connected to the supporting body.

13. The elemental analysis device according to claim 12, wherein the dust suction flow path comprises a plurality of dust suction ports that open onto a surface of the supporting body.

14. The elemental analysis device according to claim 7, further comprising a cleaning mechanism that is formed in such a way that, in a case in which the second electrode is in the open-furnace position, the cleaning mechanism moves between the first electrode and the second electrode, and removes dust from the first electrode or the second electrode, wherein the cleaning mechanism is also formed in such a way that the dust removed from the first electrode of the second electrode by the cleaning mechanism is collected from inside the heating furnace via the dust suction flow path.

15. The elemental analysis device according to claim 1, wherein the heating furnace comprises:

a first electrode;

a second electrode that is formed so as to be able to move between a closed-furnace position where it sandwiches the crucible between itself and the first electrode, and an open-furnace position that is separated by a predetermined distance from the closed-furnace position;

a drive mechanism that causes the second electrode to move between the closed-furnace position and the open-furnace position;

a dust-suction flow path that opens in the interior of the heating furnace and is equipped with a dust-suction port that draws in dust; and an ejector that is equipped with an intake port that is connected to the heating furnace side of the dust-suction flow path, a discharge port that is connected to the discharge side of the dust-suction flow path, and a drive port to which a working fluid is supplied, wherein, the cleaning gas supply mechanism is formed in such a way that, in a case in which the cleaning gas is flowing to the dust filter in an opposite direction from a direction in which the mixture gas is flowing, the working fluid flows into the drive port of the ejector.

16. An elemental analysis device comprising:

a heating furnace in which a test sample that is placed in a crucible is heated so that a sample gas is generated from the test sample;

an inflow path through which a carrier gas is introduced into the heating furnace;

an outflow path through which a mixture gas made up of the carrier gas and the sample gas is led out from the heating furnace;

a dust filter that is provided on the outflow path;

an analysis mechanism that is provided on the outflow path on a downstream side from the dust filter, and that detects one or a plurality of predetermined components contained in the mixture gas; and a cleaning gas supply mechanism that supplies cleaning gas to the dust filter in an opposite direction from a direction in which the mixture gas is flowing, wherein the heating furnace comprises:

a first electrode;

a second electrode that is formed so as to be able to move between a closed-furnace position where it sandwiches the crucible between itself and the first electrode, and an open-furnace position that is separated by a predetermined distance from the closed-furnace position;

a drive mechanism that causes the second electrode to move between the closed-furnace position and the open-furnace position;

a dust-suction flow path that opens in the interior of the heating furnace and is equipped with a dust-suction port that draws in dust; and an ejector that is equipped with an intake port that is connected to the heating furnace side of the dust-suction flow path, a discharge port that is connected to the discharge side of the dust-suction flow path, and a drive port to which a working fluid is supplied, and wherein, the drive mechanism is formed in such a way that, in a case in which the drive mechanism moves the second electrode from the closed-furnace position to the open-furnace position, the working fluid flows into the drive port of the ejector.

17. An elemental analysis device comprising:
a heating furnace in which a test sample that is placed in a crucible is heated so that a sample gas is generated from the test sample;
an inflow path through which a carrier gas is introduced into the heating furnace;
an outflow path through which a mixture gas made up of the carrier gas and the sample gas is led out from the heating furnace;
a dust filter that is provided on the outflow path;
an analysis mechanism that is provided on the outflow path on a downstream side from the dust filter, and that detects one or a plurality of predetermined components contained in the mixture gas; and
a cleaning gas supply mechanism that supplies cleaning gas to the dust filter in an opposite direction from a direction in which the mixture gas is flowing,
wherein the heating furnace comprises:
  a first electrode;
  a second electrode that is formed so as to be able to move between a closed-furnace position where it sandwiches the crucible between itself and the first electrode, and an open-furnace position that is separated by a predetermined distance from the closed-furnace position;
a drive mechanism that causes the second electrode to move between the closed-furnace position and the open-furnace position;
a dust-suction flow path that opens in the interior of the heating furnace and is equipped with a dust-suction port that draws in dust; and
an ejector that is equipped with an intake port that is connected to the heating furnace side of the dust-suction flow path, a discharge port that is connected to the discharge side of the dust-suction flow path, and a drive port to which a working fluid is supplied, and wherein,
the cleaning gas supply mechanism is formed in such a way that, in a case in which the cleaning gas is flowing to the dust filter in an opposite direction from a direction in which the mixture gas is flowing, the working fluid flows into the drive port of the ejector.

* * * * *